United States Patent
Thielbeer et al.

(10) Patent No.: US 12,043,695 B2
(45) Date of Patent: Jul. 23, 2024

(54) PROCESS FOR PREPARING A DISPERSION OF INORGANIC OXIDE PARTICLES IN POLYESTER POLYOL

(71) Applicant: BASF SE, Ludwigshafen am Rhein (DE)

(72) Inventors: Frank Thielbeer, Lemfoerde (DE); Christian Koenig, Ludwigshafen (DE); Heinz-Dieter Lutter, Lemfoerde (DE); Amir Doroodian, Lemfoerde (DE); Udo Hadick, Lemfoerde (DE)

(73) Assignee: BASF SE, Ludwigshafen am Rhein (DE)

( * ) Notice: Subject to any disclaimer, the term of this patent is extended or adjusted under 35 U.S.C. 154(b) by 813 days.

(21) Appl. No.: 16/972,199

(22) PCT Filed: Jun. 5, 2019

(86) PCT No.: PCT/EP2019/064560
§ 371 (c)(1),
(2) Date: Dec. 4, 2020

(87) PCT Pub. No.: WO2019/234065
PCT Pub. Date: Dec. 12, 2019

(65) Prior Publication Data
US 2021/0189051 A1    Jun. 24, 2021

(30) Foreign Application Priority Data
Jun. 6, 2018    (EP) .................................... 18176256

(51) Int. Cl.
C08G 18/38    (2006.01)
C08G 18/42    (2006.01)
C08K 3/34    (2006.01)
C08G 101/00    (2006.01)

(52) U.S. Cl.
CPC ..... C08G 18/4238 (2013.01); C08G 18/3895 (2013.01); C08K 3/34 (2013.01); C08G 2101/00 (2013.01); C08K 2201/005 (2013.01)

(58) Field of Classification Search
CPC ...... C08G 18/3893; C08J 9/008; C08J 9/0071
See application file for complete search history.

(56) References Cited

U.S. PATENT DOCUMENTS

| | | | |
|---|---|---|---|
| 2006/0122314 A1* | 6/2006 | Wu | C09D 175/06 524/492 |
| 2007/0043133 A1 | 2/2007 | Carvalho et al. | |
| 2007/0161731 A1 | 7/2007 | Carvalho et al. | |
| 2016/0152761 A1 | 6/2016 | Wettach et al. | |
| 2019/0177467 A1 | 6/2019 | Koenig et al. | |

FOREIGN PATENT DOCUMENTS

| | | |
|---|---|---|
| DE | 28 20 609 A1 | 11/1979 |
| DE | 195 48 770 A1 | 6/1997 |
| DE | 195 48 771 A1 | 6/1997 |
| DE | 103 38 164 A1 | 3/2005 |
| EP | 0 036 994 A2 | 10/1981 |
| EP | 0 062 835 A1 | 10/1982 |
| EP | 0 250 969 A1 | 1/1988 |
| EP | 1 171 515 B1 | 10/2002 |
| EP | 1 366 112 A1 | 12/2003 |
| WO | WO 02/083776 A1 | 10/2002 |
| WO | WO 2010/043530 A1 | 4/2010 |
| WO | WO 2017/216209 A1 | 12/2017 |

OTHER PUBLICATIONS

International Search Report issued on Jul. 10, 2019 in PCT/EP2019/064560 filed on Jun. 5, 2019.
International Preliminary Report on Patentability issued on Jun. 19, 2020 in PCT/EP2019/064560 filed on Jun. 5, 2019.

* cited by examiner

Primary Examiner — Melissa A Rioja
(74) Attorney, Agent, or Firm — Grüneberg and Myers PLLC

(57) ABSTRACT

A process for preparing a dispersion of inorganic oxide particles in polyester polyol by mechanically mixing of the inorganic oxide particles at a temperature of more than 160° C. with a polyester polyol having an acid number in the range of from 0.05 to 1.5.

16 Claims, No Drawings

PROCESS FOR PREPARING A DISPERSION OF INORGANIC OXIDE PARTICLES IN POLYESTER POLYOL

The invention relates to a process for preparing a dispersion of inorganic oxide particles in polyester polyol, the dispersion obtainable or obtained by the process, its use for preparing a polyurethane, a respective process and polyurethane.

It is known that the mechanical properties of polyurethane materials can be improved by including nanoparticles in the isocyanate or polyol component.

Thus, DE-A 103 38 164 discloses a process for producing a polyurethane foam, which comprises reacting a polyisocyanate and a polyol in the presence of a blowing agent and of silica gel particles, with the silica gel particles being functionalized with aminopropyltriethoxysilane. The silanizing reagent makes the particle surface of the silica gel particles hydrophilic, with this hydrophilic surface having surface groups which are reactive toward isocyanate. As a result, the particles are covalently bound into the polymer matrix of the foam during the polymerization reaction to form the polyurethane form and act as reinforcing material. This enables the proportion of open cells in the polyurethane foam to be regulated, which can lead to an improvement in the acoustic properties (sound damping) and the thermal insulation capability of the polyurethane foam. The surface-functionalized $SiO_2$ particles are incorporated into the polyol component. The $SiO_2$ particles are preferably produced from tetraethoxysilane in an organic solvent. This synthetic route is costly since an expensive precursor is used and, in addition, the particle yield in the synthesis is low. Furthermore, this synthesis gives particles having a size of 100 nm or more, which can be considered to be conventional fillers.

EP-A 1 366 112 discloses a process for producing a silicon dioxide dispersion by a) initial charging of an aqueous silicate solution, b) polycondensation of the silicate to a particle size of from 3 to 50 nm, c) adjustment of the silica sol obtained to an alkaline pH, d) optionally concentration of the sol, e) mixing of the sol with constituents of the outer, flowable phase of the dispersion and f) optionally removal of water and/or other solvent constituents from the dispersion. Outer flowable phases mentioned are polyols, polyamines, linear or branched polyglycol ethers, polyesters and polylactones. In the examples, a silica sol whose pH has been set to 10.5 to 11 is mixed with isopropanol and the water is removed to a content of <0.1% by atmospheric distillation. Various polyethers are then added while stirring. The volatile constituents are subsequently removed by distillation at 50° C. under reduced pressure. Mention is made of the use of the silicon dioxide dispersions for the production of closed-cell or open-cell foams based on polyurethanes, polysiloxanes, polyolefins or polystyrene. The sols have a pH of from 10 to 12 and are therefore difficult to handle. The sols have only a low concentration of silicon dioxide particles (up to 15 parts of $SiO_2$ particles per 100 parts of sol). Relatively large amounts of solvent are required, which makes the production of the silicon dioxide dispersions relatively expensive.

WO 2010/043530 discloses a method for producing polyol dispersions containing an aqueous silica sol having an average particle diameter of 1 to 150 nm. The aqueous silica sol is mixed with an organic diluent and a polyol as well as a compound having alkoxylated silyl groups and groups which are active towards an alcohol. According to example D3, an aqueous silica sol is mixed with isopropanol and trimethoxysilane obtained by reaction of 3-(2,3-epoxypropoxy)propyltrimethoxysilane and Jeffamine® XTJ-505. After the reaction, a polyol was added.

DE 28 20 609 A1 relates to a process for preparing polyurethane foams with improved mechanical properties. Alkali salts of inorganic acids are employed as reinforcing fillers. Suitable alkali salts are specifically potassium fluoride and potassium chloride. These fillers are employed in the polyol component in the form of an aqueous solution.

WO 2017/216209 A1 discloses that the polyester polyols having an acid number of less than 2 can be prepared in the presence of metal oxides as esterification catalysts.

US 2007/0161731 A1 discloses the preparation of polyester diols in the presence of dispersed inorganic fillers. The inorganic fillers, which can be aluminosilicates, can be present when reacting a diol compound with a diacid in a first esterification reaction or in a subsequent polycondensation of the hydroxyester in the previous step. In the Example, silica is employed, and the final polyester diol has an acid number of 0.43. It is stated that a very good dispersion or suspension of the inorganic filler particles is obtained in the polyester diol. Comparative example 1 of the reference discloses to add silica to a polyester diol with a molecular weight of approximately 7000, leading to the formation of silica aggregates that degrade the properties of the foam. Therefore, US 2007/161731 A1 concludes that the inorganic filler needs to be added during preparation of the polyester diol.

The object underlying the present invention is to provide stable dispersions of inorganic oxide particles, preferably of oxidic silicon particles having an average particle size in the µm-range in polyols. By employing this dispersion in the preparation of polyurethanes, the hardness of the system shall preferably be increased, the flame retardancy shall be improved and/or total organic carbon (TOC) emissions shall be reduced.

The object is achieved according to the present invention by a process for preparing a dispersion of inorganic oxide particles in polyester polyol by mechanically mixing of the inorganic oxide particles at a temperature of more than 160° C. with a polyester polyol having an acid number in the range of from 0.05 to 1.5, and the dispersion obtainable by this process.

The object is furthermore achieved by a polyester polyol dispersion comprising a polyester polyol having an acid number in the range of from 0.05 to 1.5 reacted with inorganic oxide particles.

The object is furthermore achieved by the use of this dispersion for preparing a polyurethane.

The object is furthermore achieved by a process for preparing a polyurethane comprising this dispersion with polyisocyanates and, if appropriate, one or more of further compounds having hydrogen atoms which are reactive towards isocyanates, chain extenders and/or crosslinkers, catalysts, blowing agents and further additives, and reacting the mixture to form the polyurethane.

The object is furthermore achieved by a polyurethane, obtainable by this process.

According to the present invention, it has been found that stable dispersions of inorganic oxide particles in polyester polyols can be obtained by mechanically mixing of the particles at a sufficiently high temperature of more than 160° C. with a polyester polyol having an acid number in the range of from 0.05 to 1.5.

Without being bound to a theory, it is assumed that at a temperature of more than 160° C., the acid groups of the polyester polyol can react with the inorganic oxide particles to form covalent bonds. This is especially true for inorganic oxide particles having a surface containing hydroxyl groups. Additionally, at a temperature of more than 160° C., the ester linkages in the polyester polyol can be partly cleaved, and the resulting acid groups can react with the inorganic oxide particles, specifically the hydroxyl groups on the surface of the inorganic oxide particles.

When the reaction takes place under mechanical mixing of the inorganic oxide particles, a stable dispersion can be obtained. Thus, it is assumed that the polyester polyol having an acid number in the range of from 0.05 to 1.5 can be directly reacted with inorganic oxide particles at temperatures of more than 160° C. and thereby covalently linked with the inorganic oxide particles, so that storage-stable dispersions in the polyester polyol can be obtained which can be advantageously employed for preparing polyurethanes having an increased hardness, an increased flame-retardancy and/or reduced total organic carbon (TOC) emissions.

At temperatures of 150° C. or below, no formation of a stable dispersion could be observed.

Preferably, the inorganic oxide particles are added to the (final) polyester polyol, preferably after preparing the polyester polyol.

According to the present invention, it is not necessary to employ organic solvents in the process of the invention.

According to the present invention, it has been found that by selecting polyester diols having a specific acid number, and by preferably adding the inorganic oxide particles to the final or prefabricated polyester polyol and subsequent mixing of the mixture thus obtained at temperatures of more than 160° C., the problem discussed in US 2007/161731 A1 can be obviated.

The polyester polyol employed in the process acts as a reactant for the inorganic oxide particles as well as a dispersion medium. Therefore, the inorganic oxide particles are preferably added to a prefabricated polyester polyol.

Furthermore, it is typically not necessary to employ surfactants or dispersants or emulsifiers for dispersing the inorganic oxide particles in the polyester polyol. By simply mechanically mixing the inorganic oxide particles in the polyester polyol at the required temperature, the stable dispersion can be obtained. Thus, preferably, no dispersants or surfactants or emulsifiers are employed in the process of the present invention.

The process of the present invention is carried out at a temperature of more than 160° C. Preferably, the temperature is at least 165° C. The maximum temperature is not especially critical, however, temperatures well below the decomposition temperature of the polyester polyol should be chosen. Thus, the maximum temperature is preferably 220° C., more preferably 200° C. This leads to a preferred temperature range of from 165 to 220° C., more preferably of from 170 to 190° C. for the process of the present invention.

The inorganic oxide particles which can be employed in the process of the invention, can be selected from a wide variety of inorganic oxide particles. Preferably, the inorganic oxide particles have a surface containing hydroxyl groups. Without being bound to a particular theory, it is assumed that these hydroxyl groups can be reacted with the acid groups of the polyester polyol at a temperature of more than 160° C.

The mechanical mixing in the process of the invention is performed in a manner so that a dispersion of the inorganic oxide particles in the polyester polyol is obtained, and no or only minor amounts of sediment are present in the reaction mixture. Typically, mechanical stirrers are employed to achieve this degree of mechanical mixing. After the reaction, the mechanical mixing can be stopped, and the dispersion remains stable. The term "stable" means that the dispersion remains stable upon storage for at least 3 days. Stability of the dispersion is tested at a temperature at which the dispersion is fluid. Typically, the stability of the dispersion is tested by heating the product to 90° C. As no sedimentation is detected the dispersion is classified as phase-stable.

The amount of surface hydroxyl groups can be chosen in a wide range. Preferably, the inorganic oxide particles are selected so that they have a surface containing hydroxyl groups.

Preferred inorganic oxides are selected from oxidic silicon particles, preferably silicon dioxide (silica), kaolin, silicates, silicic acids or mixtures thereof. More preferably, the inorganic oxide is selected from silicates, preferably aluminium silicates, more preferably sodium aluminium silicates or potassium aluminium silicates. Other inorganic oxides that can be employed are known to the person skilled in the art.

It can be advantageous that the inorganic oxide particles contain remaining crystal water, since the crystal water can support the hydrolysis of the polyester polyol.

The inorganic oxide particles preferably have a number average particle size $d_{50}$ of lower than 50 µm, more preferably lower than 25 µm, most preferably lower than 10 µm.

According to one embodiment of the invention, the number average particle size $d_{50}$ is in the range of from 0.1 to 49 µm, more preferably 0.5 to 24 µm, most preferably 1 to 9.5 µm. Thus, the preferred inorganic oxide particles have a particle size in the low µm-range.

The particle size can be determined by measuring the size of a certain number of particles by hand or by employing suitable analytic tools, e.g. a camsizer. Typically, at least 100 discrete particles are measured in order to obtain the $d_{50}$ value. The average particle size ($d_{50}$) is preferably the arithmetic or number mean diameter (d).

Preferably, particle sizes are determined by static laser diffraction using a Mastersizer 2000 (Malvern Instruments Ltd) after dilution of the sample with isopropanol in order to obtain an optical concentration suitable for the measurement. For the dispersion of the sample a dispersing module Hydro SM was used with a stirrer speed of 2500 rpm. The calculation of the particle size distribution may be performed by the Mastersizer 2000 using Fraunhofer theory.

According to the present invention, the amount of inorganic oxide particles, preferably oxidic silicon particles which can be included in a stable dispersion can be high. Preferably, the amount of oxidic silicon particles, based on the polyester polyol dispersion is in the range of from 5 to 60 wt %, more preferably from 15 to 45 wt %, most preferably 20 to 30 wt %.

When silicon dioxide or silicates are mixed with polyols, they typically separate after a short time, and stable dispersions cannot be obtained. In order to obtain stable dispersions, a stabilizer is normally necessary.

The polyester polyol which has reacted with the inorganic oxide particles inherently stabilizes the inorganic oxide particles in the polyester polyol dispersion. Only part of the polyester polyol is reacted with the inorganic oxide particles, thus forming the continuous dispersing medium as well as being part of the dispersed inorganic oxide particles. The polyester polyol reacted with the inorganic oxide particles can be regarded as a stabilizer which stabilizes the dispersions of inorganic oxide particles in polyols, specifically polyester polyols, so that a stable dispersion is achieved and precipitation of the particles is prevented. Thus, by the process of the present invention, a stable dispersion is obtained. Besides the polyester polyol as dispersing medium, additional polyols may be present in the dispersion or added to the dispersion after the mechanical mixing with the inorganic oxide particles. Suitable polyols can be further polyester polyols or polyether polyols. Preferably, no additional polyester polyols or polyether polyols are employed, but the part of the polyester polyol not reacted with the inorganic oxide particles forms the continuous dispersing medium.

According to the present invention, it has been found that the stable dispersion of the inorganic oxide particles can be obtained, when a polyester polyol is employed having an acid number in the range of 0.05 to 1.5, preferably from 0.01 to 1.0, more preferably from 0.3 to 0.9.

The acid number is determined by DIN EN 12634 (DIN standard of the Deutsches Institut für Normung e.V.) from 1999 and refers to $mg_{KOH}/g_{polymer}$. The unit is included in the meaning of the above numbers.

The acid number relates to the total of the polyester polyol. Thus, the polyester polyol can be one single-type of carboxyl group containing polyol. It can, however, also be a combination of a polyol having higher amounts of carboxyl groups in admixture with polyols having lesser amounts carboxyl groups or no carboxyl groups at all.

The lower the acid number, the better the polyurethane (PU) preparation becomes, since basic PU catalysts may be neutralized by the acid and accordingly higher amounts are required.

By employing polyols that have acidic (carboxylic acid) groups, the inorganic oxide particles can bind to these sites and therefore, the polyester polyol can act as a stabilizer for the dispersion of the inorganic oxide particles.

Preferably, the polyester polyol employed according to the present invention has a hydroxyl number in the range of from 10 to 150, more preferably 30 to 100, most preferably 40 to 90. The hydroxyl number is determined in accordance with DIN 53240 from 2012. It is determined in $mg_{KOH}/g_{polyesterpolyol}$. This unit is included in the meaning of the above numbers.

The hydroxyl number equally relates to the total of the polyol, confirming the above statement.

Suitable molecular weight ranges for the polyester polyols employed for the purposes of the present invention are known per se to a person skilled in the art. Preferably, the polyester polyol has a molecular weight ($M_n$) of from 500 to 30000 g/mol, more preferably 500 to 4000 g/mol, most preferably 800 to 3000 g/mol and specifically in the range of from 1000 to 2500 g/mol. As an alternative, a preferred polyester polyol can have a molecular weight ($M_n$) of from 10000 to 25000 g/mol. For instance, the molecular weight ($M_n$) can be determined by gel permeation chromatography using polystyrene as standard and tetrahydrofuran (THF) as eluent solvent.

In the present invention, the polyester polyol is based on a polyhydric alcohol. Suitable polyhydric alcohols include, for example, polyhydric aliphatic alcohols, for example aliphatic alcohols having 2, 3, 4 or more OH groups, for example 2 or 3 OH groups. Suitable aliphatic alcohols for the purposes of the present invention include, for example, $C_2$ to $C_{12}$ alcohols, preferably $C_2$ to $C_8$ alcohols and most preferably $C_2$ to $C_6$ alcohols. It is preferable for the purposes of the present invention for the polyhydric alcohol to be a diol, and suitable diols are known per se to a person skilled in the art.

Suitable aliphatic $C_2$ to $C_6$ diols include, for example, ethylene glycol, diethylene glycol, 3-oxapentane-1,5-diol, 1,3-propanediol, 1,2-propanediol, dipropylene glycol, 1,4-butanediol, 1,5-pentanediol, 1,6-hexanediol, 2-methyl-1,3-propanediol and 3-methyl-1,5-pentanediol. It is further preferable for the polyhydric alcohol to be selected from the group consisting of 1,3-propanediol and 1,4-butanediol.

In one further embodiment, the at least one polyhydric alcohol is selected from the group consisting of aliphatic $C_2$ to $C_6$ diols.

In one further embodiment, the at least one polyhydric alcohol is selected from the group consisting of 1,3-propanediol and 1,4-butanediol.

It is also possible for the purposes of the present invention to employ a polyhydric alcohol at least partly obtained from renewable raw materials. The polyhydric alcohol in question may be partly or wholly obtained from renewable raw materials. It is also possible to employ a mixture of two or more polyhydric alcohols in the present invention. Where a mixture of two or more polyhydric alcohols is employed, one or more of the polyhydric alcohols employed may be at least partly obtained from renewable raw materials.

1,3-Propanediol may accordingly comprise synthetically produced 1,3-propanediol, but in particular 1,3-propanediol from renewable raw materials ("biobased 1,3-propanediol"). Biobased 1,3-propanediol is obtainable from maize (corn) and/or sugar for example. A further possibility is the conversion of waste glycerol from biodiesel production. In one further preferred embodiment of the invention, the polyhydric alcohol is a 1,3-propanediol at least partly obtained from renewable raw materials.

In one further embodiment, the at least one polyhydric alcohol is a 1,3-propanediol at least partly obtained from renewable raw materials.

Alcohols having three or more OH groups can also be used to enhance the functionality of the polyester polyols. Examples of alcohols having three or more OH groups are glycerol, trimethylolpropane and pentaerythritol. It is also possible to use oligomeric or polymeric products having two or more hydroxyl groups. Examples thereof are polytetrahydrofuran, polylactones, polyglycerol, polyetherols, polyesterol or α,ω-dihydroxypolybutadiene.

Possible preferred starter molecules are 2- to 8-functional alcohols, such as ethylene glycol, 1,2- and 1,3-propane diol, diethylene glycol, dipropylene glycol, 1,4-butane diol, glycerol or dimethylol propane, sugars, sorbitol or pentaerythritol.

Suitable polyester polyols can, for example, be prepared from dicarboxylic acids having from 2 to 12 carbon atoms and dihydric alcohols. Examples of possible dicarboxylic acids are: adipic acid, phthalic acid, maleic acid. Examples of dihydric alcohols are glycols having from 2 to 16 carbon atoms, preferably from 2 to 6 carbon atoms, e.g. ethylene glycol, diethylene glycol, 1,4-butanediol, 1,5-pentanediol, 1,6-hexanediol, 1,10-decanediol, 1,3-propanediol and dipropylene glycol. Depending on the desired properties, the dihydric alcohols can be used either alone or, if appropriate, in mixtures with one another. As polyester polyols, preference is given to using ethanediol polyadipates, 1,4-butanediol polyadipates, ethanediol-butanediol polyadipates, 1,6-hexanediol-neopentyl glycol polyadipates, 1,6-hexanediol-1,4-butanediol polyadipates and/or polycaprolactones.

Suitable polyoxyalkylene glycols, essentially polyoxytetramethylene glycols, comprising ester groups are polycondensates of organic, preferably aliphatic dicarboxylic acids, in particular adipic acid, with polyoxymethylene glycols having a number average molecular weight of from 162 to 600 and, if appropriate, aliphatic diols, in particular 1,4-butanediol. Further suitable polyoxytetramethylene glycols comprising ester groups are polycondensates derived from polycondensation with ε-caprolactone. Suitable polyoxyalkylene glycols, essentially polyoxytetramethylene glycols, comprising carbonate groups are polycondensates of these with alkyl or aryl carbonates or phosgene.

According to the present invention, preferably the inorganic oxide particles, preferably the oxidic silicon particles are added to the (final) polyester polyol, i.e. after preparing the polyester polyol, and not to a reaction medium employed for preparing the polyester diol.

Preferably, the inorganic oxide particles, specifically the oxidic silicon particles are added to a polyester polyol having a molecular weight of from 500 to 30000 g/mol. Preferably, first, a polyester polyol is prepared from dicarboxylic acids having from 2 to 12 carbon atoms and dihydric alcohols. Specifically, aliphatic dicarboxylic acids can be reacted with polyoxymethylene glycols having a number average molecular weight of from 162 to 600, wherein first, the polyester polyol is prepared, and then, the inorganic oxide particles are added to the thus prepared polyester polyol.

The polyester polyol in the present invention can be based not only on at least one polyhydric alcohol but also on a mixture of two or more dicarboxylic acids, wherein at least one of the two or more dicarboxylic acids is at least partly obtained from renewable raw materials. Suitable dicarboxylic acids for preparing polyester polyols are known per se to a person skilled in the art and described in US 2016/0152761.

The dispersion according to the present invention has preferably a viscosity at 75° C. in the range of from 300 to 10000 mPas, more preferably 500 to 5000 mPas.

The viscosity of the polyols or dispersion is, unless indicated otherwise, determined at 25° C. in accordance with DIN EN ISO 3219 from 1994 by means of a Rheotec RC20 rotational viscometer using the spindle CC 25 DIN (spindle diameter: 12.5 mm; internal diameter of measuring cylinder: 13.56 mm), however at a shear rate of 100/1 s (instead of 50/1 s).

The molecular weight of a polyol in general may be calculated by the following formula:

$M_n = f \times 56100/\text{OH-value}$, wherein $M_n$=number average molecular weight in g/mol, f=functionality, the number of OH groups per molecule, determined by the starter used to synthesize the macromer, OH-value=hydroxyl number of oligo-polyol in mg KOH/g.

The dispersion is stable, which means that after at least 3 days of storage no deposition or precipitate can be visually determined. Dispersion stability is observed at 90° C. to guarantee liquid state of the continuous phase, i.e. the polyester which is not attached to the oxidic silicon particles.

By employing the oxidic silicon particles, the flammability and emissions such as VOC and FOG of the polyurethanes is reduced significantly. The mechanical properties are improved.

The polyol dispersion stabilized by using at least one inventive stabilizer may be used for the production of polyurethanes (PU).

Usually, in the production of polyurethanes, at least one polyol is reacted with at least one polyisocyanate having on average at least 1.7, preferably at least 2 isocyanate groups, optionally in the presence of at least one blowing agent and/or catalyst.

A typical A-component in this PU production process consists of one or more polyols, one or more polyurethane catalysts, one or more surfactants, one or more crosslinkers, water or optionally other chemical or physical blowing agents. The B-component usually contains the isocyanates.

In another embodiment of the present invention, the polymer polyol comprising the inventive stabilizer may also be used to obtain a stable A-component in a PU production process, such that the A-component may be stored for a prolonged time without phase separation.

In the final dispersion, polyols different from the ones defined above, e.g. a polyetherol prepared from at least one starter molecule comprising 2 to 8 reactive hydrogen atoms and one or more alkylene oxides having from 2 to 4 carbon atoms in the alkylene radical, may be additionally employed. The additional polyol can thus be selected from 2- to 8-functional, preferably 2- to 6-functional polyether ester polyols and/or polyester polyols of a molecular weight ($M_n$) of from 500 to 30000 g/mol, preferably 1000 to 20000 g/mol. Further polyol components are illustrated below. According to one embodiment of the invention, no additional such polyols are employed.

A more detailed discussion of polyol can be found below.

The polyurethanes according to the present invention can be cellular elastomers which address all possible applications. They can be thermoplastic polyurethanes (TPUs), as well as foams. Foams or cellular polyurethanes can be hard or soft or segmented. Applications can be manifold, including shoe soles, automotive parts, etc. The production of those materials using filled polyols is well known to the specialist in the field of invention and has been described widely, for example in EP-B 117 15 15, EP-A 62 835, EP-A 36 994, EP-A 250 969, DE-A 195 48 770 and DE-A 195 48 771.

EXPERIMENTAL PART

Acid-values were determined following DIN 53402 in its actual (2018) version.

OH-values were determined following DIN 53240 from 2012.

Particle distribution analysis has been carried out by laser diffraction using a Mastersizer® 2000 (Malvern Instruments Ltd). The distributions are given as volume distribution.

Viscosity values were determined following DIN EN ISO 3219 from 1994 (temperature and shear rate are indicated for each value).

Examples

Example 1: 20 wt % Alumina Silicate in Polyesterol 1

100 g sodium aluminium silicate (Sipernat® 820 A of Evonik) is added to 400 g of polyesterol with primary hydroxyl end groups based on adipic acid, monoethylene glycol and diethylene glycol with a molecular weight of 2000 g/mol, OH-value of 56 $mg_{KOH}/g_{polymer}$ a viscosity of 500 mPas at 75° C. and an acid-value of 0.8 $mg_{KOH}/g_{polymer}$ (Lupraphen® of BASF SE). The reaction mixture is heated up to 180° C. under vigorous stirring (400 rpm) and further stirred for 1 h. The product is released at 120° C. It was not possible to detect the viscosity at 25° C. Therefore, the viscosity was measured at 75° C. to be 2090 mPas. The OH-value was determined to be 37 $mg_{KOH}/g_{polymer}$. The particle size distribution was determined to be D[50]=11.1 μm. The product is waxy. Therefore, the stability of the dispersion was tested by heating the product to 90° C. for 3 days. No sedimentation was detected during the heating period, hence, the dispersion was classified as phase-stable.

Example 2: 20 wt % Alumina Silicate in Polyesterol 2

100 g hydrous pulverized sodium aluminium silicate (Sipernat® 820 A of Evonik) is added to 400 g of polyesterol with primary hydroxyl end groups based on adipic acid, monoethylene glycol and 1,4-butanediol with a molecular weight of 1400 g/mol, OH-value of 80 $mg_{KOH}/g_{polymer}$, a viscosity of 300 mPas at 75° C. and an acid-value of 0.4 $mg_{KOH}/g_{polymer}$ (Lupraphen® of BASF SE). The reaction mixture is heated up to 180° C. under vigorous stirring (400 rpm) and further stirred for 1 h. The product is released at 120° C. The product was characterized by a viscosity of 1340 mPas at 75° C. (shearing rate $1/100\ s^{-1}$) and a OH-value of 50 $mg_{KOH}/g_{polymer}$. The particle size distribution of the particles was determined to be D[50]=10.2 μm. The product is waxy. Therefore, the stability of the dispersion was tested by heating the product to 90° C. for 3 days. No sedimentation was detected during the heating period, hence, the dispersion was classified as phase-stable.

Comparative Examples

Comparative Example 3: 20 wt % Alumina Silicate in Polyesterol 1 GM1485-73

100 g alumina silicate (Sipernat® 820 A of Evonik) is added to 400 g of polyesterol with primary hydroxyl end groups based on adipic acid, monoethylene glycol and diethylene glycol with a molecular weight of 2000 g/mol, OH-value of 56 $mg_{KOH}/g_{polymer}$, acid-value of 0.8 $mg_{KOH}/g_{polymer}$ and a viscosity of 500 mPas at 75° C. (Lupraphen® of BASF SE). The reaction mixture is heated up to 150° C. under vigorous stirring (400 rpm) and further stirred for 1 h. The product is released at 120° C. The product was characterized by a viscosity of 2990 mPas at 75° C. (shearing rate $1/100\ s^{-1}$) and a OH-value of 38 $mg_{KOH}/g_{polymer}$. A dispersion containing 90% of particles smaller than 20.1 μm was yielded (D[50]=7.1 μm). The product is waxy. Therefore, the stability of the dispersion was tested by heating the product to 90° C. for 3 days. Sediments were detected during the heating period, hence, the dispersion was classified as not phase-stable.

Comparative Example 4: 20 wt % Alumina Silicate in Polyesterol 2 GM1485-74

100 g alumina silicate (Sipernat® 820 A of Evonik) is added to 400 g of polyesterol with primary hydroxyl end groups based on adipic acid, monoethylene glycol and 1,4-butanediol with a molecular weight of 1400 g/mol, OH-value of 80 $mg_{KOH}/g_{polymer}$, acid-value of 0.4 $mg_{KOH}/g_{polymer}$ and a viscosity of 300 mPas at 75° C. (Lupraphen® of BASF SE). The reaction mixture is heated up to 150° C. under vigorous stirring (400 rpm) and further stirred for 1 h. The product is released at 120° C. The product was characterized by a viscosity of 1750 mPas at 75° C. (shearing rate $1/100s^{-1}$) and a OH-value of 52 $mg_{KOH}/g_{polymer}$. A dispersion containing 90% of particles smaller than 20.6 μm was yielded (D[50]=7.0 μm). The product is waxy. Therefore, the stability of the dispersion was tested by heating the product to 90° C. for 3 days. Sediments were detected during the heating period, hence, the dispersion was classified as not phase-stable.

The invention claimed is:

1. A process for preparing a dispersion of inorganic oxide particles in a polyester polyol, the process comprising mechanically mixing inorganic oxide particles at a temperature of more than 160° C. with a polyester polyol having an acid number in a range of from 0.05 to 1.5,
    wherein the inorganic oxide particles are added to the polyester polyol, after preparing the polyester polyol.
2. The process of claim 1, wherein the temperature of mechanically mixing is at least 165° C.
3. The process of claim 1, wherein the inorganic oxide particles have surfaces comprising hydroxyl groups.
4. The process of claim 1, wherein the inorganic oxide particles are oxidic silicon particles.
5. The process of claim 4, wherein the inorganic oxide particles are silicates.
6. The process of claim 1, wherein the polyester polyol has an acid number in a range of from 0.1 to 1.0.
7. The process of claim 1, wherein the polyester polyol has a hydroxyl number in a range of from 10 to 150.
8. The process of claim 1, wherein the inorganic oxide particles have a number average particle size $d_{50}$ of lower than 50 μm.
9. The process of claim 1, wherein the polyester polyol has a molecular weight (Me) of from 500 to 30000 g/mol.
10. A dispersion of inorganic oxide particles in a polyester polyol, obtainable by mechanically mixing oxidic silicon particles having a number average particle size $d_{50}$ being an arithmetic or number mean diameter (d) in a range of from 0.5 to 24 μm at a temperature of more than 160° C. with a polyester polyol having an acid number in a range of from 0.05 to 1.5,
    wherein the oxidic silicon particles are added to the polyester polyol, after preparing the polyester polyol.
11. A polyester polyol dispersion comprising a polyester polyol having an acid number in a range of from 0.05 to 1.5 reacted with oxidic silicon particles having a number average particle size $d_{50}$ being an arithmetic or number mean diameter (d) in a range of from 0.5 to 24 μm at a temperature of more than 160° C. with a polyester polyol having an acid number in a range of from 0.05 to 1.5,
    wherein the oxidic silicon particles are added to the polyester polyol, after preparing the polyester polyol.
12. A process for preparing a polyurethane, the process comprising obtaining the dispersion of claim 10.
13. A process for preparing a polyurethane,
    the process comprising: mixing the dispersion of claim 10 with a polyisocyanate and optionally one or more
selected from the group consisting of further compounds having hydrogen atoms which are reactive towards isocyanates, chain extenders and/or crosslinkers, catalysts, blowing agents and further additives, to obtain a mixture; and
    reacting the mixture to form the polyurethane.
14. The process of claim 13, wherein the polyurethane is a polyurethane foam and the mixture comprises a blowing agent.
15. The process of claim 13, wherein the polyurethane is a compact polyurethane material.
16. A polyurethane, obtainable by the process of claim 13.

* * * * *